United States Patent
Lin et al.

(10) Patent No.: US 7,290,724 B2
(45) Date of Patent: Nov. 6, 2007

(54) BLENDER

(75) Inventors: Fang-Chuan Lin, Tainan (TW);
Chien-Chung Lee, Taipei (TW);
Chia-Hung Hsieh, Yung-Ho (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 219 days.

(21) Appl. No.: 11/238,363

(22) Filed: Sep. 29, 2005

(65) Prior Publication Data
US 2006/0086843 A1   Apr. 27, 2006

(30) Foreign Application Priority Data
Oct. 26, 2004   (TW) .............................. 93217002 U

(51) Int. Cl.
*B02C 25/00* (2006.01)
(52) U.S. Cl. .................. 241/36; 241/282.1; 99/486; 99/510; 366/314; 366/601
(58) Field of Classification Search .................. 241/30, 241/36, 92, 282.1, 282.2; 366/314, 601; 99/486, 510
See application file for complete search history.

(56) References Cited

U.S. PATENT DOCUMENTS

| 5,852,968 A * | 12/1998 | Sundquist ..................... 99/492 |
| 6,397,735 B1 * | 6/2002 | Wong .......................... 99/492 |
| 6,758,592 B2 * | 7/2004 | Wulf et al. ................. 366/205 |
| 6,793,167 B2 * | 9/2004 | Karkos et al. ........... 241/101.2 |

* cited by examiner

*Primary Examiner*—Mark Rosenbaum
(74) *Attorney, Agent, or Firm*—Ladas & Parry LLP

(57) ABSTRACT

A blender includes a container mounted removably on a housing for containing food items and provided with a cutting blade unit that is to be driven rotatably by a motor unit when the container is mounted on the housing. A control unit is operable in accordance with an initial control signal from a switch unit so as to activate the motor unit to operate in a judgment mode. The control unit determines food processing conditions in accordance with a motor rotation signal generated by a sensor unit for indicating a rotary speed of the motor unit when the motor unit is operated in the judgment mode. The control unit switches operation of the motor unit from the judgment mode to a food processing mode upon determining the food processing conditions so as to drive rotation of the cutting blade unit to blend the food items contained in the container.

19 Claims, 4 Drawing Sheets

US 7,290,724 B2

BLENDER

CROSS-REFERENCE TO RELATED APPLICATION

This application claims priority of Taiwanese Application No. 093217002, filed on Oct. 26, 2004.

BACKGROUND OF THE INVENTION

1. Field of the Invention

The invention relates to a blender, more particularly to a blender that can process food items contained therein in accordance with food processing conditions that were determined by the blender.

2. Description of the Related Art

A conventional blender is generally provided with various select buttons, each of which is operable to select a processing speed or operating mode of a motor unit for driving rotation of a cutting blade unit so as to blend food items to be processed. As such, in actual use, the user operates the select buttons based on previous experience in connection with the food items to be processed. Therefore, optimal processing of food items cannot be ensured for an inexperienced user.

SUMMARY OF THE INVENTION

The object of the present invention is to provide a blender that can process food items contained therein in accordance with food processing conditions that were determined by the blender.

According to the present invention, a blender comprises:

a motor base including a housing and a motor unit mounted in the housing, the motor unit having a blade driving section disposed upwardly and outwardly of the housing;

a container adapted for containing food items and having a container bottom mounted removably on the housing, the container bottom being provided with a cutting blade unit that is coupled to the blade driving section when the container bottom is mounted on the housing and that is to be driven rotatably by the motor unit;

a switch unit mounted on the housing and operable so as to generate an initial control signal;

a sensor unit mounted in the housing and associated operably with the motor unit, the sensor unit generating a motor rotation signal for indicating a rotary speed of the motor unit; and a control unit mounted in the housing and connected to the motor unit, the switch unit and the sensor unit, the control unit being operable in accordance with the initial control signal from the switch unit so as to activate the motor unit to operate in a judgment mode, the control unit determining at least one food processing condition in accordance with the motor rotation signal generated by the sensor unit when the motor unit is operated in the judgment mode, the control unit switching operation of the motor unit from the judgment mode to a food processing mode upon determining the food processing condition so as to drive rotation of the cutting blade unit to blend the food items contained in the container.

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION OF THE PREFERRED EMBODIMENT

Figure 1:
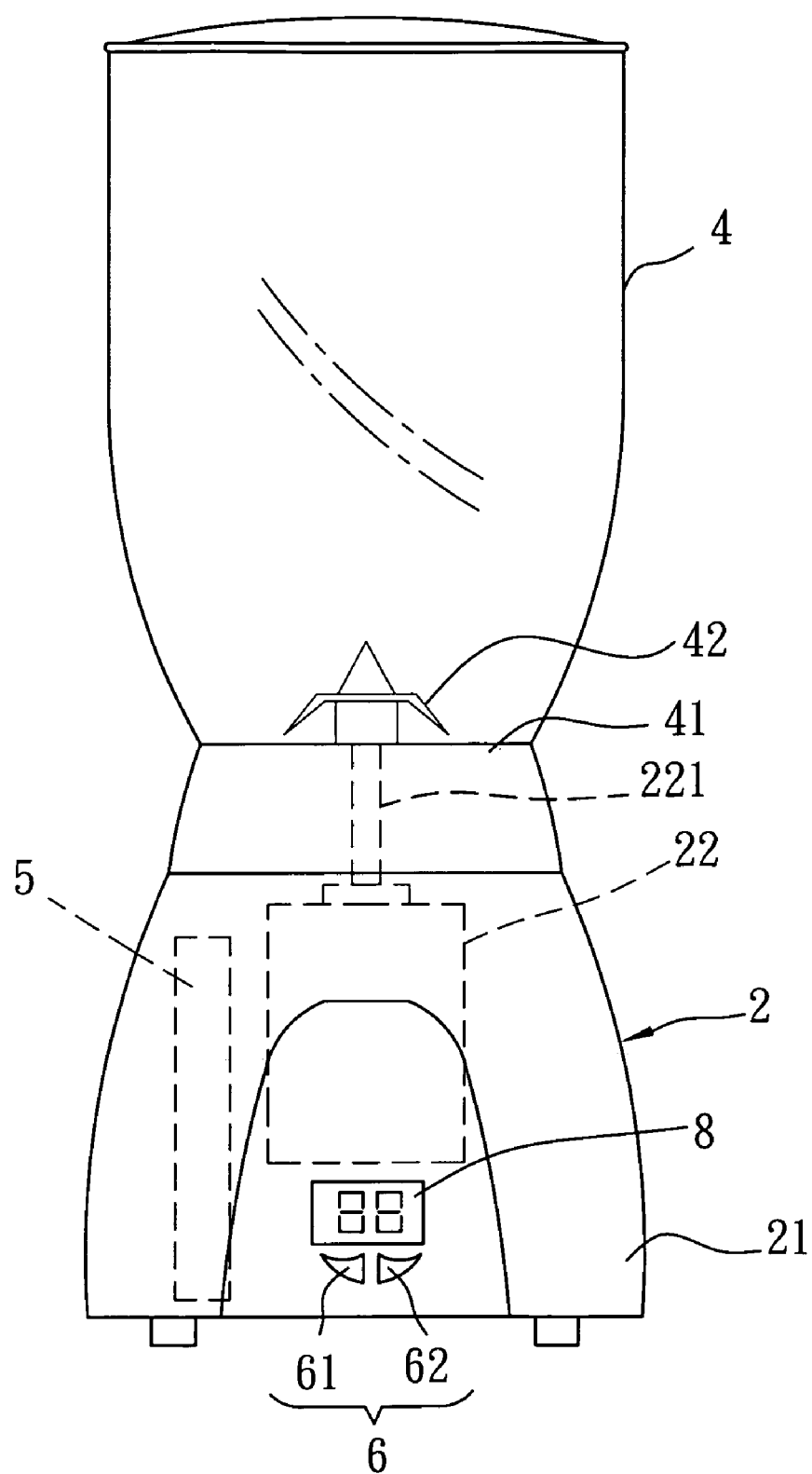
FIG. 1 is a schematic front view showing the preferred embodiment of a blender according to this invention.
Figure 2:
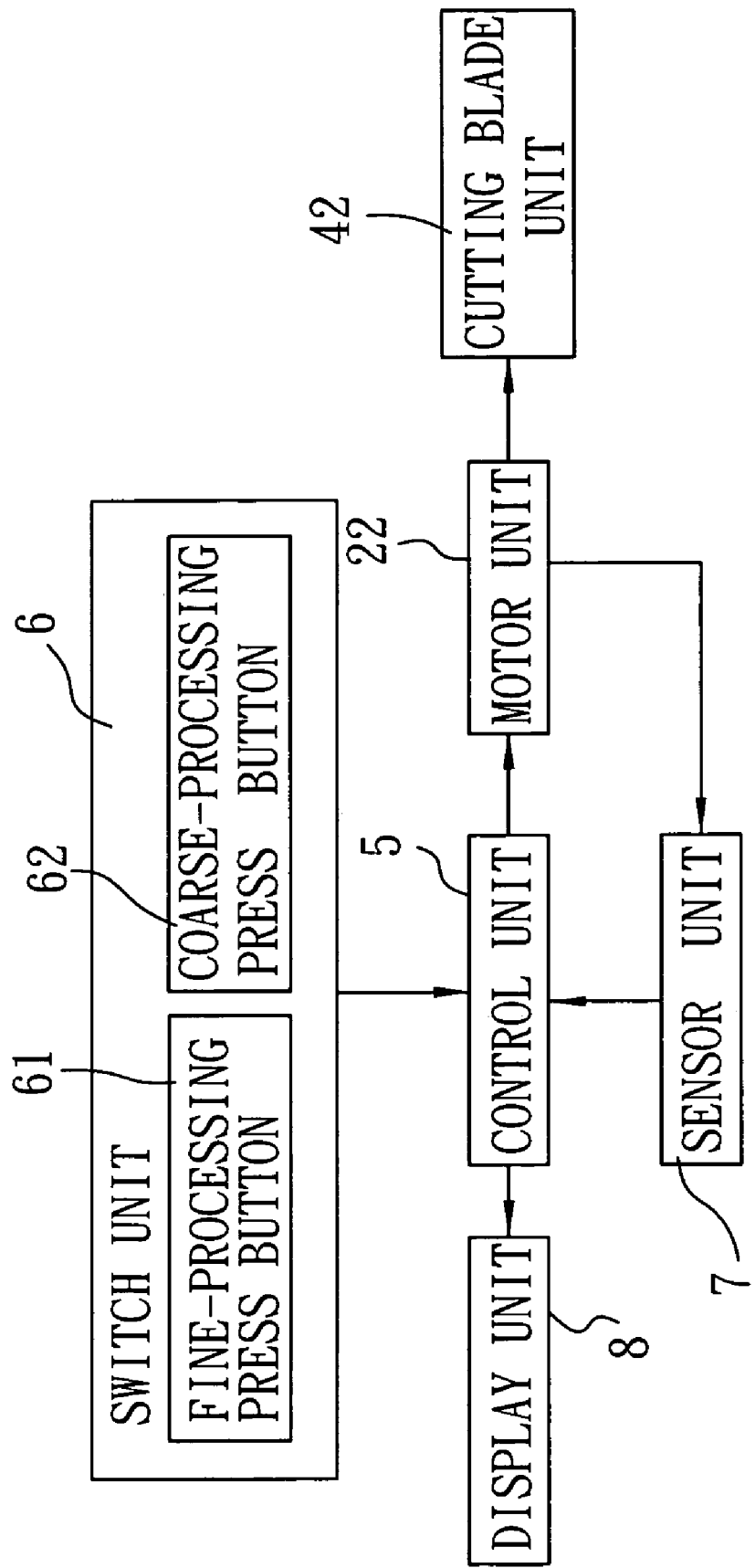
FIG. 2 is a schematic circuit block diagram of the preferred embodiment.

Referring to FIGS. 1 and 2, the preferred embodiment of a blender according to the present invention is shown to include a motor base 2, a container 4, a switch unit 6, a sensor unit 7, and a control unit 5.

The motor base 2 includes a housing 21, and a motor unit 22 mounted in the housing 21. The motor unit 22 has a blade driving section 221 disposed upwardly and outwardly of the housing 21.

The container 4 is adapted for containing food items (not shown), and has a container bottom 41 mounted removably on the housing 21 of the motor base 2. The container bottom 41 is provided with a cutting blade unit 42 that is coupled to the blade driving section 221 when the container bottom 41 is mounted on the housing 21 of the motor base 2 and that is to be driven rotatably by the motor unit 22, as shown in FIG. 1. In this embodiment, when the cutting blade unit 42 is driven by the motor unit 22 to rotate in a clockwise direction, food items (not shown) contained in the container 4 are cut.

The switch unit 6 is mounted on the housing 21, and is operable so as to generate an initial control signal. In this embodiment, the switch unit 6 includes coarse-processing and fine-processing press buttons 62, 61 mounted on the housing 21. The initial control signal is associated with a depressed one of the coarse-processing and fine-processing press buttons 62, 61.

The sensor unit 7, such as a Hall sensor, is mounted in the housing 21, and is associated operably with the motor unit 22. The sensor unit 7 generates a motor rotation signal for indicating a rotary speed of the motor unit 22 in a known manner.

The control unit 5, such as a microcontroller, is mounted in the housing 21, and is connected to the motor unit 22, the switch unit 6 and the sensor unit 7.

A display unit 8, which is in the form of two seven-segment displays as shown in FIG. 1, is mounted on the housing 21, and is connected to the control unit 5 for displaying processing-time information.

The control unit 5 is operable in accordance with the initial control signal from the switch unit 6 so as to activate the motor unit 22 to operate in a judgment mode. The control unit 5 determines food processing conditions in accordance with the motor rotation signal generated by the sensor unit 7 when the motor unit 22 is operated in the judgment mode. The control unit 5 switches operation of the motor unit 22 from the judgment mode to a food processing mode upon determining the food processing conditions so as to drive rotation of the cutting blade unit 42 to blend the food items contained in the container 4.

Figure 3:
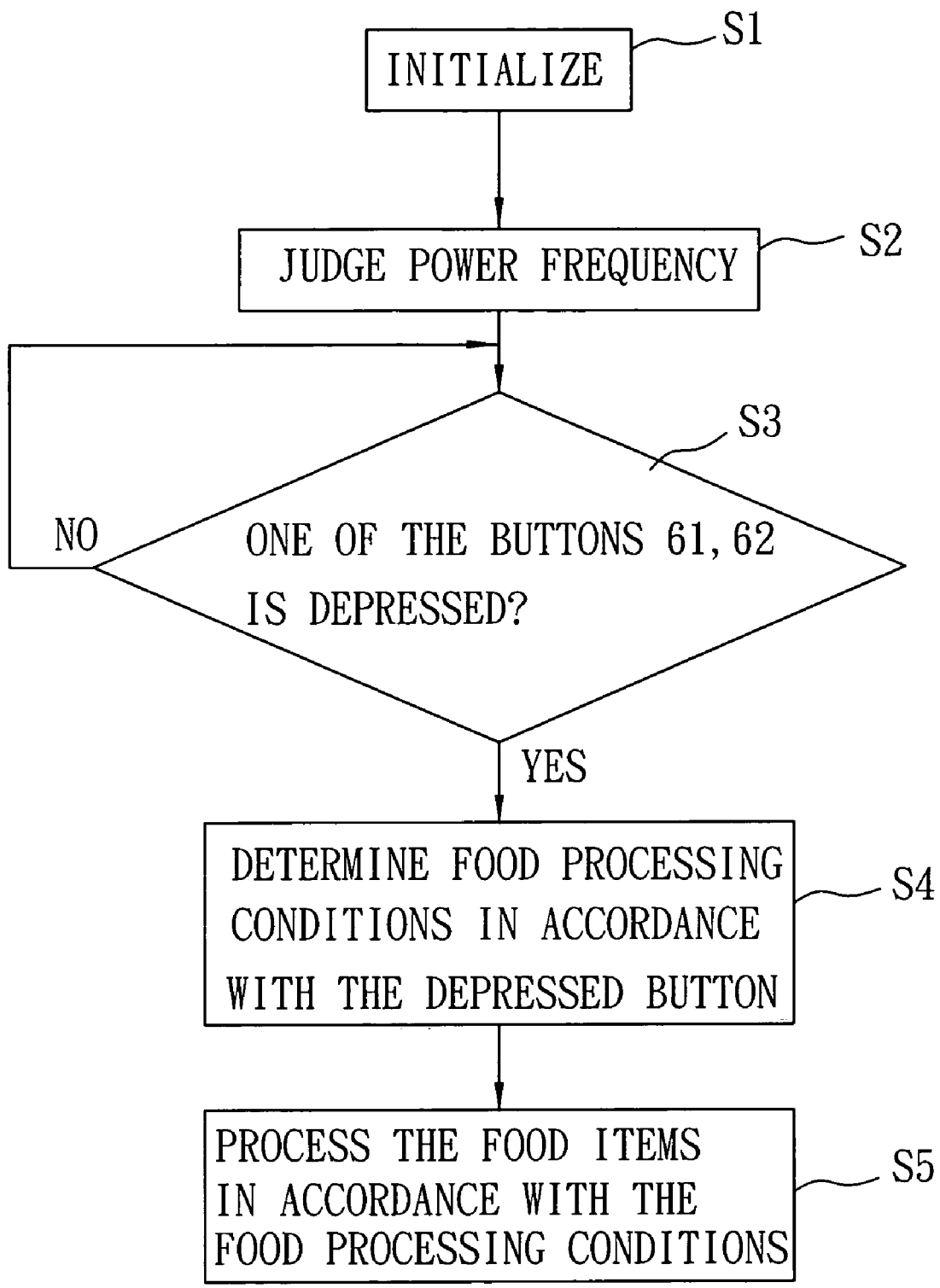
FIG. 3 is a flow chart illustrating operation of the preferred embodiment.

FIG. 3 illustrates the operating procedure of the blender of the preferred embodiment. In step S1, the control unit 5 is configured to perform initialization upon power-on to reset system parameters to initial values. In step S2, the control unit 5 is configured to judge a frequency, such as 50 Hz or 60 Hz, of a power supplied to the blender. In step S3, the control unit 5 detects whether one of the coarse-processing and fine-processing press buttons 62, 61 is depressed. If negative, step S3 is repeated. When a depressed one of the coarse-processing and fine-processing press buttons 62, 61 is detected, the control unit 5 receives the initial control signal, which is associated with the depressed one of the coarse-processing and fine-processing press buttons 62, 61, from the switch unit 6, and the flow goes to step S4. At the same time, a buzzer (not shown) is used to generate an audio output to indicate button operation.

Figure 4:
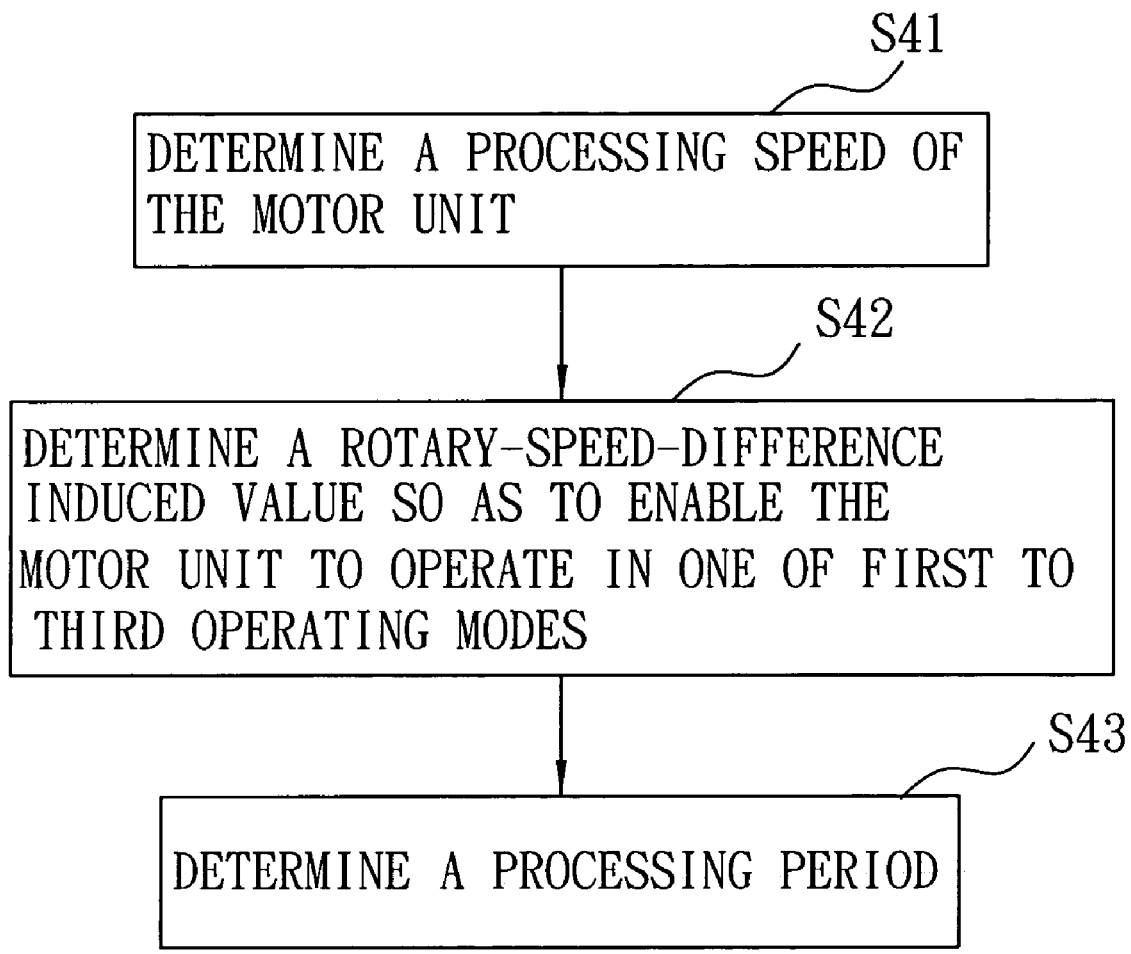
FIG. 4 is a flow chart illustrating determination of food processing conditions in the preferred embodiment how to determine food processing conditions.

In step S4, the control unit 5 activates the motor unit 22 to operate in the judgment mode, and then determines the food processing conditions in accordance with the motor rotation signal generated by the sensor unit 7 when the motor unit 22 is operated in the judgment mode. In this embodiment, the food processing conditions include a processing speed of the motor unit 22, a rotary-speed-difference induced value (M), and a processing period (T) determined respectively in three sub-steps S41, S42, S43, as shown in FIG. 4.

In sub-step S41, the control unit 5 activates the motor unit 22 to rotate in a first direction, which is a clockwise direction in this embodiment such that sharpened edges of blades of the cutting blade unit 42 are leading edges, for a first predetermined period, such as 4 seconds in this embodiment, during the judgment mode, and determines the processing speed in accordance with the motor rotation signal generated by the sensor unit 7 within the first predetermined period. In this embodiment, the control unit 5 determines an average rotary speed of the motor unit 22 from the motor rotation signal generated by the sensor unit 7 within the first predetermined period. As such, the processing speed is equal to a predetermined parameter, which is included in the initial values in step S1, multiplied by a difference between a predetermined standard rotary speed, which is included in the initial values in step S1, and the average rotary speed. For example, the predetermined standard rotary speed is 10000 RPM, and the rotary speeds of the motor unit 22 at second, third and fourth seconds within the first predetermined period are 1000 RPM, 2000 RPM, and 3000 RPM, respectively, so that the average rotary speed is 2000 RPM (i.e., (1000+2000+3000)/3=2000). It is noted that the processing speed associated with pressing of the coarse-processing press button 62 is less than that associated with pressing of the fine-processing press button 61. In this embodiment, the aforesaid processing speed associated with pressing of the fine-processing press button 61 is twice that associated with pressing of the coarse-processing press button 62. Furthermore, the control unit 5 applies a variable voltage to the motor unit 22 to maintain the rotary speed thereof at the processing speed during the food processing mode in this embodiment.

In step S42, the control unit 5 further activates the motor unit 22 to rotate in a second direction, which is a counter-clockwise direction in this embodiment such that blunt edges of the blades of the cutting blade unit 42 are leading edges, for a second predetermined period, such as 4 seconds in this embodiment, during the judgment mode. The control unit 5 determines a plurality of rotary speed differences, each of which is a difference between a consecutive pair of instantaneous rotary speeds of the motor unit 22 that were obtained from the motor rotation signal generated by the sensor unit 7 within the second predetermined period. The rotary-speed-difference induced value (M) is equal to a largest one of the rotary speed differences minus a smallest one of the rotary speed differences when the largest one of the rotary speed difference is posterior to the smallest one of the rotary speed differences, and is equal to a smallest one of the rotary speed differences minus a largest one of the rotary speed differences when the smallest one of the rotary speed differences is posterior to the largest one of the rotary speed differences. In this embodiment, there are 16 instantaneous rotary speeds of the motor unit 22 extracted at time intervals of 0.05 second within the second predetermined period. Therefore, 15 rotary speed differences M1, M2, . . . , M15 are obtained. For example, if the last five rotary speeds of the motor unit 22 are 700 RPM, 500 RPM, 600 RPM, 600 RPM and 700 RPM, respectively, such that M12~M15 are −200 RPM, +100 RPMs, 0 and +100 RPMs, respectively, and if the largest and smallest ones of M1~M15 are +100 RPM and −200 RPM, respectively, the rotary-speed-difference induced value (M) is +300 (i.e., +100−(−200)=+300) when the largest rotary speed difference is posterior to the smallest rotary speed difference. In another example, if the last five rotary speeds of the motor unit 22 are 500 RPM, 600 RPM, 600 RPM, 700 RPM and 650 RPM, respectively, such that M12~M15 are +100 RPM, 0, +100 RPM and −50 RPM, respectively, and if the largest and smallest ones of M1~M15 are +100 RPM and −50 RPM, respectively, the rotary-speed-difference induced value (M) is −300 (i.e., −50−100=−150) when the smallest rotary speed difference is posterior to the largest rotary speed difference.

In step S42, the control unit 5 enables the motor unit 22 to operate in one of a first operating mode when the rotary-speed-difference induced value (M) is not greater than a first predetermined value (A) (i.e., M≦A), a second operating mode when the rotary-speed-difference induced value (M) is greater than the first predetermined value (A) but is not greater than a second predetermined value (B) (i.e., A<M≦B), and a third operating mode when the rotary-speed-difference induced value (M) is greater than the second predetermined value (B) (i.e., B<M) In this embodiment, the first and second predetermined values (A, B) are included in the initial values in step S1. In this embodiment, the motor unit 22 is activated by the control unit 5 to rotate continuously in the first direction when operated in the first operating mode. The motor unit 22 is activated by the control unit 5 to rotate intermittently in the first direction, such as rotate for 4 seconds, stop for 2 seconds, . . . , in cycles, when operated in the second operating mode. The motor unit 22 is activated by the control unit 5 to rotate intermittently and alternately in the first and second directions, such as rotate in the first direction for 4 seconds, stop for 2 seconds, rotate in the second direction for 4 seconds, stop for 2 seconds, . . . , in cycles, when operated in the third operating mode.

For example, according to step S42, if the first and second predetermined values (A, B) are 200 and 600, respectively, and if the rotary-speed-difference induced value (M) is +300 (i.e., A<M<B), the control unit 5 enables the motor unit 22 to operate in the second operating mode during actual food processing.

In step S43, the control unit 5 further activates the motor unit 22 to rotate in the first direction for a third predetermined period, such as 1 second in this embodiment, during the judgment mode by applying a fixed voltage to the motor unit 22. The control unit 5 then determines the processing period (T) in accordance with variance of the motor rotation signal generated by the sensor unit 7 after the third predetermined period has lapsed. In this embodiment, the processing period (T) includes a first processing sub-period (T1) and a second processing sub-period.

There are two ways to determine the first processing sun-period (T1) in this embodiment. In one way, when the control unit 5 applies a variable voltage to the motor unit 22 in step S41, the first processing sub-period (T1) is equal to a variance ratio ($\Delta V$) of first and second voltages (V1, V2), which were applied respectively by the control unit 5 to the motor unit 22 at first and second time points within the first predetermined period, multiplied by a period difference ($\Delta T_{down}$) between a predetermined reference time, which is included in the initial values in step S1, and a calculated period associated with the reduction in the rotary speed of the motor unit 22 within the third predetermined period, i.e., $T1=\Delta V \times \Delta T_{down}$, whereas in another way, when the control unit 5 applies a fixed voltage to the motor unit 22 in step S41, the first processing sub-period (T1) is equal to the period difference ($\Delta T_{down}$).

As an example, if the first and second voltages (V1, V2) are 40 volts and 90 volts, respectively, and if a predetermined voltage gradient is 10 volts, the variance ratio ($\Delta V$) is equal to 5 (i.e., (90−40)/10=5). Since each reduction period of 0.01 second corresponds to an accumulated period of 0.5 second in this example, if it takes 1.2 seconds for the rotary speed of the motor unit 22 to drop below 400 RPM after the third predetermined period has lapsed, the calculated period (i.e., the total accumulated period) is obtained as 60 seconds (i.e., (1.2/0.01)×0.5=60). In the case where the predetermined reference time is 65 seconds, the period difference ($\Delta T_{down}$) is equal to 5 seconds (i.e., 65−60=5). Therefore, $T1=\Delta V \times \Delta T_{down}=5 \times 5$ seconds=25 seconds.

In this embodiment, the second processing sub-period is associated with predetermined modifier and threshold parameters that are included in the initial values in step S1. The predetermined modifier parameter corresponds to an accumulated period of rotation of the motor unit 22 in the first direction at the stable processing speed within the second processing sub-period. The predetermined threshold parameter corresponds to an accumulated period of rotation of the motor unit 22 in the first direction, regardless of the rotary speed of the motor unit 22, within the second processing sub-period and is used to limit excessively long food processing operations. As such, the second processing sub-period can be calculated based on the selected one of the first to third operating modes for the motor unit 22, and one of the predetermined modifier and threshold parameters. In the above example, if the motor unit 22 is activated to operate in the third operating mode where the control unit 5 activates the motor unit 22 to rotate in the first direction for 4 seconds, stop for 2 seconds, rotate in the second direction for 4 seconds, stop for 2 seconds in each cycle having a cycle period of 12 seconds, and the period of rotation of the motor unit 22 in the first direction at the stable processing speed within each cycle period is actually only 3 seconds, and if the predetermined modifier and threshold parameters are 15 seconds and 40 seconds, respectively, the second processing sub-period is equal to four cycle periods (i.e., 12×4 seconds) adding 4 seconds within the fifth cycle period. The second processing sub-period is obtained as 52 seconds (i.e., the motor unit 22 has rotated in the first direction at the stable processing speed within an accumulated period equal to 15 seconds). Therefore, the processing period (T) is 77 seconds (25+52=77). On the other hand, if the period of rotation of the motor unit 22 in the first direction at the stable processing speed within each cycle period is only 1 second, using the same modifier and threshold parameters, since 15 cycle periods are needed for the motor unit 22 to accumulate 15 seconds of rotation in the first direction at the stable processing speed, the second processing sub-period becomes 10 cycle periods (10×4 seconds=40 seconds) in view of the threshold parameter.

In step S5, the food items contained in the container 4 are processed in accordance with the processing speed, the operating mode and the processing period (T) determined respectively in steps S41, S42 and S43. In this embodiment, the display unit 8 displays the processing-time information related to a remaining period of the predetermined modifier parameter that is yet to be completed within the second processing sub-period. Moreover, upon completion, the control unit 5 enables the buzzer to generate an indicating audio output.

Preferably, upon detection of pressing of one of the coarse-processing and fine-processing press buttons by the control unit 5 after activation of the motor unit 22, the control unit 5 terminates the operation of the motor unit 22, and enables the buzzer to generate a warning audio output.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A blender comprising:
   a motor base including a housing and a motor unit mounted in said housing, said motor unit having a blade driving section disposed upwardly and outwardly of said housing;
   a container adapted for containing food items and having a container bottom mounted removably on said housing, said container bottom being provided with a cutting blade unit that is coupled to said blade driving section when said container bottom is mounted on said housing and that is to be driven rotatably by said motor unit;
   a switch unit mounted on said housing and operable so as to generate an initial control signal;
   a sensor unit mounted in said housing and associated operably with said motor unit, said sensor unit generating a motor rotation signal for indicating a rotary speed of said motor unit; and
   a control unit mounted in said housing and connected to said motor unit, said switch unit and said sensor unit, said control unit being operable in accordance with the initial control signal from said switch unit so as to activate said motor unit to operate in a judgment mode;
   said control unit determining at least one food processing condition in accordance with the motor rotation signal generated by said sensor unit when said motor unit is operated in the judgment mode;
   said control unit switching operation of said motor unit from the judgment mode to a food processing mode upon determining the food processing condition so as to drive rotation of said cutting blade unit to blend the food items contained in said container.

2. The blender as claimed in claim 1, wherein the food processing condition includes a processing speed of said motor unit.

3. The blender as claimed in claim 2, wherein said control unit activates said motor unit to rotate for a predetermined period during the judgment mode, and determines the processing speed in accordance with the motor rotation signal generated by said sensor unit within the predetermined period.

4. The blender as claimed in claim 3, wherein said control unit determines an average rotary speed of said motor unit from the motor rotation signal generated by said sensor unit within the predetermined period, the processing speed being equal to a predetermined parameter multiplied by a difference between a predetermined standard rotary speed and the average rotary speed.

5. The blender as claimed in claim 3, wherein said switch unit includes coarse-processing and fine-processing press buttons mounted on said housing, the initial control signal being associated with a depressed one of said coarse-processing and fine-processing press buttons.

6. The blender as claimed in claim 5, wherein the processing speed associated with pressing of said coarse-processing press button is less than that associated with pressing of said fine-processing press button.

7. The blender as claimed in claim 2, wherein said control unit applies a variable voltage to said motor unit to maintain the rotary speed thereof at the processing speed during the food processing mode.

8. The blender as claimed in claim 1, wherein said control unit is configured to enable said motor unit to operate in one of a first operating mode, where said motor unit is activated by said control unit to rotates continuously in a first direction, a second operating mode, where said motor unit is activated by said control unit to rotate intermittently in the first direction, and a third operating mode, where said motor unit is activated by said control unit to rotate intermittently and alternately in the first direction and an opposite second direction.

9. The blender as claimed in claim 8, wherein the food processing condition includes a rotary-speed-difference induced value (M), said control unit activating said motor unit to rotate for a predetermined period during the judgment mode, said control unit determining a plurality of rotary speed differences, each of which is a difference between a consecutive pair of instantaneous rotary speeds of said motor unit that were obtained from the motor rotation signal generated by said sensor unit within the predetermined period, the rotary-speed-difference induced value (M) being equal to a largest one of the rotary speed differences minus a smallest one of the rotary speed differences when the largest one of the rotary speed differences is posterior to the smallest one of the rotary speed differences, and being equal to a smallest one of the rotary speed differences minus a largest one of the rotary speed differences when the smallest one of the rotary speed differences is posterior to the largest one of the rotary speed differences.

10. The blender as claimed in claim 9, wherein:
when the rotary-speed-difference induced value (M) is not greater than a first predetermined value (A), said control unit enables said motor unit to operate in the first operating mode;
when the rotary-speed-difference induced value (M) is greater than the first predetermined value (A) but is not greater than a second predetermined value (B) said control unit enables said motor unit to operate in the second operating mode; and
when the rotary-speed-difference induced value (M) is greater than the second predetermined value (B), said control unit enables said motor unit to operate in the third operating mode.

11. The blender as claimed in claim 1, wherein the food processing condition includes a processing period (T).

12. The blender as claimed in claim 11, wherein said control unit activates said motor unit to rotate for a predetermined period during the judgment mode, said control unit determining the processing period (T) in accordance with variance of the motor rotation signal generated by said sensor unit after the predetermined period has lapsed.

13. The blender as claimed in claim 12, wherein
said control unit activates said motor unit to rotate in a first direction during the judgment mode, and determines a processing speed in accordance with the motor rotation signal generated by said sensor unit within a first predetermined period,
the processing period (T) including
a first processing sub-period (T1) that is equal to a variance ratio of first and second voltages, which were applied respectively by said control unit to said motor unit at first and second time points within the first predetermined period, multiplied by a period difference between a predetermined reference time and a calculated period associated with the reduction in the rotary speed of said motor unit within the predetermined period, and
a second processing sub-period associated with one of a predetermined modifier parameter that corresponds to an accumulated period of rotation of said motor unit in a direction at the processing speed within the second processing sub-period, and a predetermined threshold parameter that corresponds to an accumulated period of rotation of said motor unit in the direction within the second processing sub-period.

14. The blender as claimed in claim 12, wherein
said control unit activates said motor unit to rotate in a first direction during the judgment mode, and determines a processing speed in accordance with the motor rotation signal generated by said sensor unit within a first predetermined period,
the processing period (T) including
a first processing sub-period (T1) that is equal to a period difference between a predetermined reference time and a calculated period associated with the reduction in the rotary speed of said motor unit within the predetermined period, and
a second processing sub-period associated with a predetermined modifier parameter that corresponds to an accumulated period of rotation of said motor unit in a direction at the processing speed, and a predetermined threshold parameter that corresponds to an accumulated period of rotation of said motor unit in the direction.

15. The blender as claimed in claim 1, wherein the food processing condition is one of a processing speed of said motor unit, a rotary-speed-difference induced value (M), and a processing period (T).

16. The blender as claimed in claim 15, wherein said control unit applies a variable voltage to said motor unit to maintain the rotary speed thereof at the processing speed during the food processing mode.

17. The blender as claimed in claim 15, wherein
said control unit further activates said motor unit to rotate in a first direction for a first predetermined period during the judgment mode, and determines the processing speed in accordance with the motor rotation signal generated by said sensor unit within the first predetermined period, said control unit activating said motor unit to rotate in a second direction opposite to the first direction for a second predetermined period during the judgment mode, said control unit determining a plurality of rotary speed differences, each of which is a difference between a consecutive pair of instantaneous rotary speeds of said motor unit that were obtained from the motor rotation signal generated by said sensor unit within the second predetermined period, the rotary-speed-difference induced value (M) being equal to a largest one of the rotary speed differences minus a smallest one of the rotary speed differences when the largest one of the rotary speed differences is posterior to the smallest one of the rotary speed differences, and being equal to a smallest one of the rotary speed differences minus a largest one of the rotary speed differences when the smallest one of the rotary speed differences is posterior to the largest one of the rotary speed differences, said control unit further activating said motor unit to rotate in the first direction for a third predetermined period during the judgment mode, said control unit determining the processing period (T) in accordance with variance of the motor rotation signal generated by said sensor unit after the third predetermined period has lapsed.

18. The blender as claimed in claim 17, wherein said control unit is configured to enable said motor unit to operate in one of a first operating mode when the rotary-speed-difference induced value (M) is not greater than a first predetermined value (A), a second operating mode when the rotary-speed-difference induced value (M) is greater than the first predetermined value (A) but is not greater than a second predetermined value (B), and a third operating mode when the rotary-speed-difference induced value (M) is greater than the second predetermined value (B).

19. The blender as claimed in claim 18, wherein said motor unit is activated by said control unit to rotate continuously in the first direction when operated in the first operating mode, said motor unit being activated by said control unit to rotate intermittently in the first direction when operated in the second operating mode, said motor unit being activated by said control unit to rotate intermittently and alternately in the first and second directions when operated in the third operating mode.

* * * * *